United States Patent [19]

Maeda et al.

[11] Patent Number: 5,137,979

[45] Date of Patent: Aug. 11, 1992

[54] MULTI-LAYER STRUCTURE POLYMER AND RESIN COMPOSITION

[75] Inventors: Katsuaki Maeda; Hajime Nishihara, both of Yokohama; Junji Seki, Tokyo, all of Japan

[73] Assignee: Asahi Kasei Kogyo Kabushiki Kaisha, Osaka, Japan

[21] Appl. No.: 480,971

[22] Filed: Feb. 16, 1990

[30] Foreign Application Priority Data

| Feb. 17, 1989 [JP] | Japan | 1-037835 |
| Mar. 7, 1989 [JP] | Japan | 1-054737 |
| Aug. 11, 1989 [JP] | Japan | 1-206734 |
| Sep. 6, 1989 [JP] | Japan | 1-229326 |
| Dec. 12, 1989 [JP] | Japan | 1-320435 |

[51] Int. Cl.⁵ ................ C08F 265/04; C08F 265/06
[52] U.S. Cl. .................... 525/309; 525/67; 525/308; 525/902
[58] Field of Search ............. 525/308, 902, 309

[56] References Cited

U.S. PATENT DOCUMENTS

| 4,473,679 | 9/1984 | Falk et al. |
| 4,542,179 | 9/1985 | Falk et al. |
| 4,564,653 | 1/1986 | Kamota et al. ........... 525/902 |

FOREIGN PATENT DOCUMENTS 48-23341  7/1973  Japan .................. 525/308

Primary Examiner—Jacob Ziegler
Attorney, Agent, or Firm—Birch, Stewart, Kolasch & Birch

[57] ABSTRACT

A multi-layer structure polymer (A) comprising (i) 2 to 30% by weight of an alkyl methacrylate unit, (ii) 50 to 80% by weight of an alkyl acrylate unit, (iii) 5 to 20% by weight of an unsaturated nitrile unit and (iv) 5 to 40% by weight of an aromatic vinyl unit, wherein:

(a) the multi-layer structure polymer consists essentially of an inner layer and an outer layer in a ring form, the portion of the inner layer ($\beta$ layer) within the ring has an average diameter of 2,000 to 6,500 Å, (b) the outer layer ($\alpha$ layer) portion surrounding the inner layer in the ring form has an average thickness of 200 to 500 Å, (c) the inner layer portion has a plurality of small particles ($\gamma$ layer) totally micro-dispersed, and (d) the multi-layer structure polymer has an acetone-insoluble portion having (i) a swell degree in methyl ethyl ketone of 1.5 to 10 and (ii) a tensile modulus of 1,000 to 10,000 kg/cm², a resin composition having excellent weatherability and impact resistance comprising the multi-layer structure polymer (A) and at least one thermoplastic resin, and a molded article produced therefrom.

5 Claims, 1 Drawing Sheet

MULTI-LAYER STRUCTURE POLYMER AND RESIN COMPOSITION

BACKGROUND OF THE INVENTION

1. Field of the Invention

This invention relates to a novel multi-layer structure polymer having excellent weatherability, etc., and a thermoplastic resin composition containing the multi-layer structure polymer and being excellent in weatherability, impact resistance and appearance.

2. Related Art

Polycarbonate and methacrylic resins have comparatively better weatherability among plastics. Since, however, their mechanical strength, processability, price, etc., are not necessarily well-balanced from the general point of view, their application fields are limited.

On the other hand, ABS resin has excellent impact resistance and well-balanced mechanical properties, and is also easily processable and comparatively less expensive. Due to these advantages, it is widely used in fields of automobile, electric parts, etc. However, since the ABS resin uses polybutadiene as one of its components, it involves a problem concerning weatherability, and is thought to be unsuitable in fields for outdoor use. Thus, it has been long desired to develop plastics containing an ABS resin in which the weatherability is remarkably improved.

Under the above circumstances, it has been taken into consideration to use rubbers other than diene-based rubbers, and the use of saturated rubbers has been proposed at various times. An acrylic acid ester-based polymer is one of the rubbers proposed. Its use makes it possible to improve the weatherability, but does involve a degradation of the impact resistance and appearance of molded articles made therefrom, which results in a problem in its practical use.

For example, Japanese Patent Publication No. 27576/1980 discloses a process for producing a multi-stage, consecutive structure polymer comprising a hard polymer produced at a first stage, a rubbery elastomer polymer produced at an intermediate stage and a hard polymer produced at a third stage. In this process, the use of a grafting agent and a crosslinking agent at the first stage gives a resin composition having low haze and impact resistance.

However, the scope of any practical use of the above resin composition is limited since it has low impact strength.

Japanese Patent Publication No. 36645/1984 discloses a process for producing a multi-stage polymer comprising methacrylic acid ester and acrylic acid ester. However, this polymer has insufficient impact resistance.

OBJECT AND SUMMARY OF THE INVENTION

Taking the above present situation into account, this invention has an object to provide a novel multi-layer structure polymer which is free from the above problems, and is, i.e., excellent in weatherability, etc., and a thermoplastic resin composition which has excellent weatherability and impact resistance, and is characterized with an excellent appearance.

1: sea phase, 2: island phase, 3: α layer, 4: β layer, 5: γ layer, 6: independent layer

DETAILED DESCRIPTION OF PREFERRED EMBODIMENTS

The first aspect of this invention relates to a multi-layer structure polymer (A) comprising (i) 2 to 30% by weight of an alkyl methacrylate unit, (ii) 50 to 80% by weight of an alkyl acrylate unit, (iii) 5 to 20% by weight of an unsaturated nitrile unit and (iv) 5 to 40% by weight of an aromatic vinyl unit, wherein:

(a) the multi-layer structure polymer consists essentially of an inner layer and an outer layer in a ring form, the portion of the inner layer (β layer) within the ring has an average diameter of 2,000 to 6,500 Å, (b) the outer layer (α layer) portion surrounding the inner layer in the ring form has an average thickness of 200 to 500 Å, (c) the inner layer portion has a plurality of small particles (γ layer) totally micro dispersed, and (d) the multi-layer structure polymer has an acetone-insoluble portion having (i) a swell degree in methyl ethyl ketone of 1.5 to 10 and (ii) a tensile modulus of 1,000 to 10,000 kg/cm$^2$.

The second aspect of this invention relates to a resin composition having excellent weatherability and impact resistance, which is a composition (C) comprising the above multi-layer structure polymer (A) and at least one thermoplastic resin (B) having a Tg of not less than 60° C., wherein:

(e)' the resin composition (C) has an acetone-insoluble portion having (i) a swell degree in methyl ethyl ketone of 1.5 to 10 and (ii) a tensile modulus of 1,000 to 10,000 kg/cm$^2$.

The third aspect of this invention relates to a resin composition according to the resin composition (C), which comprises at least one thermoplastic resin (B) having Tg of not less than 60° C. and selected from the group consisting of (1) a polycarbonate resin, (2) a methacrylic resin (3) an unsaturated nitrile-aromatic vinyl copolymer, (4) an unsaturated nitrile-aromatic vinyl-N-substituted maleimide terpolymer and (5) an unsaturated nitrile-aromatic vinyl-alkyl acrylate terpolymer.

The present invention will be explained more specifically below.

A. Multi-layer structure polymer;

I. Composition of multi-layer structure polymer;

The multi-layer structure polymer of this invention has a composition consisting essentially of (i) an alkyl methacrylate unit, (ii) an alkyl acrylate unit, (iii) an unsaturated nitrile unit and (iv) an aromatic vinyl unit.

Examples of (i) the alkyl methacrylate unit as a component of the multi-layer structure polymer include methyl methacrylate, ethyl methacrylate, propyl methacrylate, etc., in which methyl methacrylate is particularly usable.

Examples of (ii) the alkyl acrylate unit include methyl acrylate, ethyl acrylate, propyl acrylate, butyl acrylate, etc., in which butyl acrylate is particularly usable.

Examples of (iii) the unsaturated nitrile unit include acrylonitrile, methacrylonitrile, etc., in which acrylonitrile is particularly usable.

Examples of (iv) the aromatic vinyl unit include styrene, α-methylstyrene, styrene halide, etc., in which styrene is particularly usable.

II. Compositional proportions, etc., for multi-layer structure polymer.

The compositional proportions for the multi-layer structure polymer are, in general, required to be as follows. (i) The proportion of the alkyl methacrylate unit is 2 to 30% by weight, preferably 5 to 15% by weight. (ii) The proportion of the alkyl acrylate unit is 50 to 80% by weight, preferably 55 to 70% by weight. (iii) The proportion of the unsaturated nitrile unit is 5 to 20% by weight, preferably 6 to 10% by weight. (iv) The proportion of the aromatic vinyl unit is 5 to 40% by weight, preferably 8 to 35% by weight.

A deviation of the proportion of any of the units from the above corresponding range is undesirable in view of its effect on the impact resistance.

Further, the swell degree in methyl ethyl ketone of the acetone-insoluble portion is required to be 1.5 to 10, and the tensile modulus thereof is required to be 1,000 to 10,000 kg/cm$^2$. A deviation of each of these properties from the above corresponding range results in a polymer having insufficient impact resistance.

III. Fine structure of multi-layer structure polymer:

The multi-layer structure polymer of this invention has a very special structure in that small particles of the γ layer are totally micro-dispersed in the β layer, and in that the β layer has an average diameter of 2,000 to 6,500 Å and is covered with the α layer having an average diameter of 200 to 500 Å.

This special structure has a greatly improved surface glossiness, and in addition, it has maintained good impact resistance and weatherability properties.

This achieved effect is unexpected in view of the results obtained from the multi-layer structures which has been conventionally proposed.

That is, in a process disclosed in Japanese Patent Publication No. 109811/1972, when a grafting agent or crosslinking agent such as allyl methacrylate is used at a time of polymerization of a hard polymer at a first stage, a first-stage (crosslinkied) hard polymer stained with no osmic acid is present in a β layer portion. More specifically, a multi-layer structure polymer is formed which comprises two regions; one region is a portion in which small particles of the γ layer are totally micro-dispersed in the β layer, and the other is a spherical portion in which no γ layer is present (independent portion). In this case, there is a serious problem of a decrease of the impact resistance.

In the multi-layer structure of this invention, therefore, when the β layer is not covered with the α layer, there is obtained a polymer having insufficient impact resistance and weatherability, and in a case in which a plurality of small particles of the γ layer are not micro-dispersed in the β layer portion, it is not possible to obtain any polymer which satisfies both the surface glossiness and the impact resistance.

The β layer is required to have an average diameter (particle diameter) of 2,000 to 6,500 Å, preferably 2,500 to 4,000 Å. When the β layer has an average diameter of less than 2,000 Å, the resultant polymer has insufficient impact resistance, and also when said average diameter exceeds 6,500 Å, the impact resistance is insufficient.

The average thickness of the α layer covering the periphery of the β layer is required to be 200 to 500 Å, preferably 300 to 400 Å. When the average thickness of the α layer is less than 200 Å, the impact resistance is insufficient, and when it exceeds 500°, the glossiness is degraded to a great extent.

In the multi-layer structure polymer of this invention, the composition, molecular weight, crosslinking density and inter-distance of crosslinked points of the β layer are required to be suitably adjusted in order to micro-disperse a plurality of small particles of the γ layer totally in the β layer.

In the multi-layer structure polymer of this invention, the description that, small particles of the γ layer are totally micro-dispersed in the β layer, stands for a state in which a plurality of small particles of the γ layer are relatively uniformly dispersed in the whole of the β layer. Therefore, in a case in which the β layer includes two regions, as in the above-mentioned conventional multi-layer structure, in which one region is a portion having small particles of the γ layer micro-dispersed and the other is a spherical portion (independent portion) having no particle of the γ layer, it cannot be said that the small particles of the γ layer are totally micro-dispersed.

As an embodiment of the total micro-dispersion of a plurality of small particles of the γ layer in the β layer, it is preferable to micro-disperse a plurality of small particles of the γ layer in the whole of the β layer uniformly. The embodiment is however not limited thereto.

It is preferable to micro-disperse a plurality of the small particles of the γ layer in the β layer totally and uniformly as an embodiment of the micro and total dispersion of a plurality of the small particles of the γ layer in the β layer. This invention is, however, not limited thereto. Further, the number of the small particles of the γ layer is not specially limited, and any number would be within the scope of this invention. It is however, more preferable that a relatively larger number of the small particles are uniformly dispersed.

Further, it is also preferable that the sizes of the small particles of the γ layer are comparatively similar, although they may vary to some extent.

IV. Process for producing multi-layer structure polymer;

Concerning the production of the multi-layer structure polymer of this invention, it is advantageous to use a known emulsion polymerization process carried out in the presence of a monomer, emulsifier, polymerization initiator, chain transfer agent, etc.

For the formation of such a multi-layer structure polymer, it is further advantageous to use a seed polymerization method in which the multi-layer structure polymer can be formed by consecutively adding individual monomers or a mixture of the monomers.

The specific process for producing the multi-layer structure polymer of this invention is as follows.

Polymerization at first stage

A mixture liquid of 2 to 30% by weight of an alkyl methacrylate and 1 to 6% by weight of an alkyl acrylate is polymerized together with an emulsifier and polymerization initiator in a monomer/water ratio of 0.3 to 1.0.

In a case in which a crosslinking agent or a graft crosslinking agent is used at this stage, there is obtained a polymer having a low impact resistance.

Polymerization at second stage

The same monomer mixture liquid as those used in the first stage is polymerized, in which the particle size can be controlled by using part of a seed latex obtained in the first stage. The polymerization at this second stage can be omitted.

Polymerization at third stage

A monomer liquid consisting of 45 to 70% by weight of an alkyl acrylate and 0.05 to 5% by weight of a crosslinking agent is subjected to an emulsion polymerization together with an emulsifier and polymerization initiator.

Polymerization at fourth stage

| Alkyl acrylate | 4–8% by weight |
|---|---|
| Unsaturated nitrile | 4–8% by weight |
| Aromatic vinyl | 2–5% by weight |
| Crosslinking agent | 0.005–0.5% by weight |

A monomer liquid consisting of the above materials is subjected to an emulsion polymerization together with an emulsifier and a polymerization initiator.

Polymerization at fifth stage

| Alkyl acrylate | 0–2% by weight |
|---|---|
| Aromatic vinyl | 1–16% by weight |
| Unsaturated nitrile | 3–38% by weight |

A monomer liquid consisting of the above materials is subjected to an emulsion polymerization together with an emulsifier and a polymerization initiator.

When the polymerizations at the third stage and thereafter are carried out, it is necessary to select conditions which prevent the formation of new particles as soon as possible, and this can be achieved by adjusting the emulsifier amount to less than the critical miscelle concentration. Further, whether or not new particles are formed can be observed by using an electron microscope.

The specific particle size (diameter) range of each of the layers of the multi-layer structure polymer can be controlled in the following manner or by some other methods. When part of the seed latex for the innermost hard polymer (polymerized at the first stage) is taken out to continue the seed polymerization by adding ion-exchanged water, an emulsifier and monomers, the amount of the seed latex to be taken out is adjusted thereby to control the number of particles of the seed latex.

The polymerization temperature for the formation of the polymer and/or the copolymer at each of the stages is selected from the range between 30° and 120° C., preferably between 50° and 100° C.

The optional polyfunctional crosslinking agent (v) is a crosslinking monomer having at least two C=C double bonds, and examples thereof include known crosslinking agents, i.e., esters of triallyl isocyanurates such as triallyl cyanurate, triallyl isocyanurate, etc., and unsaturated alcohol; divinyl compounds such as divinyl benzene; diallyl compounds, dimethacryl compounds such as ethylene glycol dimethacrylate, and the like, in which triallyl isocyanurate is particularly usable.

The emulsifier for the polymerization is not specially limited, and any of conventional emulsifier can be used. Examples thereof include anionic emulsifiers such as sulfonates of $C_2$–$C_{22}$ carboxylic acids, $C_6$–$C_{22}$ alcohols or alkyl phenols, nonionic emulsifiers such as adducts of aliphatic amines or amides with alkylene oxides, cationic emulsifiers such as quaternary ammonium-containing compounds, and the like. It is preferable to use long-chain alkyl carboxylates, alkylbenzene sulfonates, etc.

Further, the polymerization initiator to be used together is also not specially limited. For example, water-soluble peroxides, such as an alkali metal salt, ammonium salt, etc., of persulfuric acid, an inorganic initiator such as carbonate, hydrogen peroxide, and azo compounds such as azobisbutyronitrile, etc., are usable alone or as a redox initiator in combination with a sulfite or sulfate. Further, redox initiators such as oil-soluble organic peroxide/ferrous salt, organic peroxide/sodium sulfoxylate, etc., are also usable.

Examples of the chain transfer agent include alkyl mercaptans such as t-dodecylmercaptan, etc., toluene, xylene, chloroform, halogenated hydrocarbon, etc.

The monomers may be added at the some time. However, it is desirable to separate these monomers into several portions and add these separated monomers at several separate intervals or to add them continuously. In this case, the polymerization reaction can be controlled, and an overheating and coagulation problem can be prevented.

In the advantageous production of the multi-layer structure polymer of this invention, it is desirable to form each of the layers by a method adjusted as follows.

In the formation of the rubbery elastomer, a monomer for the rubbery elastomer may be added and be subjected to successive polymerization, after the polymerization reaction of an acrylate crosslinked product has been completed, or while an unreacted monomer remains before the completion of an acrylate crosslinked product, the unsaturated nitrile (iii), aromatic vinyl (iv), etc., are added to form the rubbery elastomer.

V. Others

The multi-layer structure polymer having a special structure, obtained by the above polymerization process, is obtained as a particulate solid by subjecting its polymer latex to treatment such as salting-out, washing, drying, etc., according to known methods.

Such a multi-layer structure polymer is usually obtained as a mixture of a multi-layer structure polymer itself, which is insoluble in solvents such as acetone, etc., and pure, with a nongrafted polymer which is soluble in solvents such as acetone. Therefore, what is defined as the multi-layer structure polymer herein, includes the multi-layer structure polymer per se and a mixture of the multi-layer structure polymer with the above nongrafted polymer.

The multi-layer structure polymer having the special structure of this invention, is obtained by the polymerization process described in (IV) above, and the characteristics of the polymer produced at each of the stages are as follows.

(1) The polymer produced in the first and second stages, serves to characterize the multi-layer structure polymer with an increased elastic modulus, and is important in determining the final particle diameter of the multi-layer structure polymer in the seed polymerization.

In particular, if a grafting agent or a cross-linking agent is present in the first stage polymerization, there is obtained only a multi-layer structure polymer having a low impact resistance.

(2) The acrylate crosslinked product produced in the third stage polymerization mainly serves to impart impact strength.

(3) The rubber elastomer obtained in the fourth stage polymerization mainly serves to improve the adhesion of the hard polymer of the first and second stage polymerizations and the acrylate crosslinked polymer of the third stage polymerization to the final polymer.

(4) The final polymer produced in the final stage polymerization serves to improve the compatibility with a thermoplastic resin which is further blended therewith.

B. Constitution of thermoplastic resin composition containing the multi-layer structure polymer:

The multi-layer structure polymer (A) is blended with a thermoplastic resin, preferably a thermoplastic resin (B) having a Tg of not less than 60° C., to give a thermoplastic resin composition (C) which is excellent in weatherability, impact resistance and appearance.

The blending ratio of these two is not specially limited, and differs depending upon the type of thermoplastic resin (B), purpose in use of the composition, etc. In general, however, the effective amount of each of these two is in the range of 5 to 95% by weight.

When the amount of the multi-layer structure polymer (A) is less than 5% by weight, there is no effect on the improvement of the impact resistance, and when it exceeds 95% by weight, the rigidity and heat resistance are degraded.

As the thermoplastic resin having a Tg of not less than 60° C. of this invention, preferably usable is a resin of one or a combination of two or more thermoplastic resins selected from the group consisting of (1) a polycarbonate resin, (2) a methacrylic resin, (3) an unsaturated nitrile-aromatic vinyl copolymer, (4) an unsaturated nitrile-aromatic vinyl-N-phenylmaleimide terpolymer and (5) an unsaturated nitrile-aromatic vinyl-alkyl acrylate terpolymer.

The thermoplastic resin (B) is further specifically described as follows:

(1) As the polycarbonate resin, a polycarbonate of 2,2'-(4,4'-dihydroxy-diphenyl)propane and 4,4'-dioxydiallylalkane-based polycarbonates are preferably usable.

(2) The methacrylic resins includes homopolymers of methacrylates or copolymers of methacrylates and acrylates. Examples of the methacrylates include alkyl methacrylates, such methacrylate, etc., or aromatic methacrylates such as phenyl methacrylate, benzyl methacrylate, etc. In particular, the use of the methyl methacrylate is preferable.

Examples of the acrylate comonomers include alkyl acrylates such as methyl acrylate, ethyl acrylate, butyl acrylate, etc., and aromatic acrylates, such as phenyl acrylate, benzyl acrylate, etc., and the use of the methyl acrylate, ethyl acrylate or butyl acrylate is preferable.

In the copolymers of methacrylates and acrylates, those consisting of 80 to 99% by weight of the methacrylate unit and 1 to 20% by weight of the acrylate unit are preferable.

(3) Examples of the unsaturated nitrile-aromatic vinyl copolymers include copolymers of unsaturated nitriles, such as acrylonitrile, methacrylonitrile, etc., acrylonitrile in particular, and aromatic vinyls such as styrene, α-methyl styrene, vinyl toluene, halogenated styrene, etc., styrene in particular.

These unsaturated nitrile-aromatic vinyl copolymers can be produced by subjecting an unsaturated nitrile and an aromatic vinyl to a conventional polymerization method, such as solution polymerization, suspension polymerization or emulsion polymerization.

Unsaturated nitrile-aromatic vinyl copolymers containing 20 to 50% by weight of the unsaturated nitrile unit, are preferable.

(4) As the unsaturated nitrile-aromatic vinyl-N-substituted maleimide terpolymers, preferable are those containing 5 to 40% by weight, preferably 10 to 30% by weight, of the unsaturated nitrile unit, 30 to 70% by weight, preferably 35 to 60% by weight, of the aromatic vinyl unit and 26 to 50% by weight, preferably 26 to 40% by weight, of the N-substituted maleimide unit Examples of the unsaturated nitrile and aromatic vinyl as the components of said terpolymers are described as follows:

The N-substituted maleimide is represented by the following general formula wherein R represents alkyl, substituted alkyl, aryl or substituted aryl Examples thereof include N-methylmaleimide, N-ethylamaleimide, N-butylmaleimide, N-phenylmaleimide, N-cyclohexylmaleimide, N-chlorophenylmaleimide, etc. Of these, the N-phenylmaleimide is particularly preferable in view of the heat resistance improvement obtain due to its use, and in view of its availability and economy The above terpolymers are produced by subjecting an unsaturated nitrile, aromatic vinyl and N-substituted maleimide to a conventional polymerization method, such as solution polymerization, suspension polymerization or emulsion polymerization.

When the amount of the aromatic vinyl unit is less than 30% by weight, the mechanical strength is low, and when it exceeds 70% by weight, the heat resistance is degraded. When the amount of the unsaturated nitrile unit is less than 5% by weight, the mechanical strength is low, and when it exceeds 40% by weight, the heat resistance is degraded. Further, wh ı th amount of the N-substituted maleimide unit ss than 26% by weight, there is not any sufficient effect on the improvement in heat resistance, and when it exceeds 50% by weight, the mechanical strength is degraded.

(5) As the unsaturated nitrile-aromatic vinyl-alkyl acrylate terpolymers, preferable are those containing 20 to 50% by weight of the unsaturated nitrile unit, 5 to 15% by weight of the alkyl acrylate unit and 35 to 75% by weight of the aromatic vinyl.

Examples of the unsaturated nitrile and aromatic vinyl as the components of the terpolymers are as described in the above (3).

Examples of the alkyl acrylate are as described in the above (1). In particular, the use of butyl acrylate is preferable.

The above-described multi-layer structure polymer (A) and thermoplastic resin (B) having a Tg of not less than 60° C. are melt-kneaded in a commercially available single-screw extruder or twin-screw extruder to produce the resin composition of this invention.

The resin composition of this invention can be easily separated into the above multi-layer structure polymer (A) which is insoluble in solvents such a acetone, etc., and the above thermoplastic resin (B) which is soluble in the acetone. In addition, a thermoplastic polymer, which is formed as a mixture with the multi-layer structure polymer without being grafted at the time of polymerization of the multi-layer structure polymer, is acetone-soluble.

Therefore, the acetone-insoluble portion [multi-layer structure polymer (A)] is required to have (i) a swell degree in methyl ethyl ketone of 1.5 to 10 and (ii) a tensile modulus of 1,000 to 10,000 kg/cm$^2$.

If these requirements are not met, there is undesirably obtained a polymer having insufficient impact resistance.

When the components for the resin composition of this invention are kneaded, it is possible to incorporate a UV light absorber, stabilizer, lubricant, filler, reinforcing agent, dye, pigment, etc., as required.

The resin composition of this invention so obtained is injection-molded or extruded to produce molded articles having excellent surface gloss and impact resistance.

EXAMPLES

This invention will be further described in detail by reference to Examples, which, however, shall not limit this invention.

In Examples and Comparative Examples, the following methods or measuring apparatus as are used for measurements.

(1) Izod impact strength;
According to ASTM D 256

(2) Preparation of the sample for an electron microscope observation;

The average diameter of the β layer and the average thickness of the α layer of the multi-layer structure polymer of this invention are measured as follows.

A multi-layer structure polymer and PMMA (Delpet, mfd. by Asahi Kasei Kogyo K.K.) are kneaded in a 30 mmΦ twin-screw extruder (AS-30, manufactured by Nakatani Kikai Seisakusho). Then, the resultant extrudate is sliced into a ultra-thin piece having a size of not more than 0.5 mm, and its surfaces are finishcut with a diamond knife. This sample is stained by exposing it to steam of a 1% ruthenic acid aqueous solution in a closed container for several hours while lights are turnal off.

When the composition is observed by using an electron microscope, it has a sea-island structure. The island portion consists of a ruthenium-stained portion and a non-stained portion. The portion not stained with the ruthenic acid is referred to as a β layer, and the portion being present outside the β layer, surrounding the β layer in a ring form and stained with the ruthenic acid is referred to as an α layer. A plurality of small particles stained with the ruthenic acid are dispersed in the β layer, and the small particles are referred to as a γ layer.

(3) Average diameter (particle diameter), average thickness;

A sample is taken from molded article, and a ultra-thin sliced piece stained with ruthenic acid is prepared as above. Then, a transmission-type electron microscope photograph (magnification: 100,000 diameters) of the slided piece is taken, and 100 particles are selected at random to measure their diameters. The arithmetic mean of the 100 diameters is referred to as an average diameter (particle diameter).

In this case, when a particle is not considered to be spherical, its major and minor axes are measured to obtain an arithmetic mean, and this arithmetic mean is regarded as a diameter of the particle.

Concerning the thickness, the thicknesses of 100 particles selected at random were measured to obtain an arithmetic mean, which is referred to as an average thickness. In this case, when the thickness is not uniform, the major and minor thicknesses are measured to obtain an arithmetic means, and this arithmetic mean is regarded as a thickness.

(4) Swell degree;

Methyl ethyl ketone (30 ml) is added to about 0.5 g of pellets to immerse the pellets therein at 25° C. for 24 hours. Then, the mixture is shaken for 5 hours and then subjected to a centrifuge at 5° C. at 18,000 rpm for 1 hour. The supernatant liquid is removed by decantation, and 30 ml of methyl ethyl ketone is newly added. The mixture is shaken at 25° C. for 1 hour, and subjected to a centrifuge at 5° C. at 18,000 rpm for 1 hour. The supernatant liquid is removed, and the weight of the remaining substance is measured ($W_3$). Thereafter, the substance is dried under vacuum at 100° C. for 2 hours, and the weight of the remainder is measured ($W_4$).

The swell degree is calculated on the basis of the following equation.

$$\text{Swell degree} = \frac{W_3 - W_4}{W_4}$$

(5) Composition analysis;

Concerning the acetone-soluble portion, supernatant liquids (a) and (b) obtained by acetone separation are dissolved in a large amount of methanol, and the precipitate is dried under vacuum and analyzed.

Concerning the acetone-insoluble portion, samples obtained by acetone classification ar used. The samples each are subjected to gas chromatograph for composition analysis.

(6) Tensile modulus;

An insoluble portion obtained by the acetone classification is compression-molded at 150° C. to prepare a film, from which a test piece having a width of 15±0.5 mm, a thickness of 0.50±0.05 mm and a length of 70 mm is prepared.

The measurement is made by using a tensile tester at an interchuck distance of 50 mm and a draw rate of 50 mm/minute.

(7) Surface gloss;

A mirror surface glossiness at an incident angle of 60 degrees is determined on the basis of ASTM-D523-62T.

(8) Weatherability;

A weatherability test is carried out under a cycle of irradiating a sample at 60° C. by the use of a weathermeter (model UMWL-S, manufactured by Suga Tester K.K.) and forming the dew at 40° C.

(9) Melt-viscosity;

An acetone-soluble portion is treated with alcohol, and the resultant precipitate is dried, and dissolved in methyl ethyl ketone to prepare a 10 wt. % polymer solution. 10 ml of the solution is charged into a viscometer, and a falling time $t_1$ seconds is measured in a constant temperature bath at 25° C. Separately, by using a standard liquid for correction of which the viscosity is known (prepared on the basis of JIS Z8809-1978), the above procedure is repeated to obtain a falling time $t_0$ seconds. A viscosity tube coefficient K is calculated from these data according to the following equation, and the solution viscosity is obtained from a product of the falling time of the polymer solution and the viscosity coefficient K. The unit is centipoise (cps).

$$\text{Viscosity tube coefficient } K = \frac{\eta_0}{t_0} \times \frac{d}{d_0}$$

wherein:
$\eta_0$: viscosity of standard liquid at 25° C. (cps)
$t_0$: falling time of standard liquid at 25° C. (sec)
d: density of 10 wt. % polymer solution (g/cm$^3$)
$d_0$: density of standard liquid at 25° C. (g/cm$^2$)

EXAMPLE 1

(1) Polymerization of a hard polymer in an innermost layer (first stage for seed):

A reactor is charged with 248.3 parts by weight of ion-exchanged water and 0.05 part of sodium dihexylsulfosuccinate, and the substitution of nitrogen is fully carried out while the mixture is stirred, and then the temperature inside the reactor is elevated to 75° C. This reactor is continuously charged with 0.02 part by weight of ammonium persulfate, and it is then charged with a mixture of 8 parts by weight of methyl methacrylate and 2 parts by weight of butyl acrylate continuously over 50 minutes. Thereafter, 0.01 part by weight of ammonium persulfate is further added, and the reaction is continued at 75° C. for 45 minutes. The polymerization ratio is 99%.

(2) Polymerization of a hard polymer in an innermost layer (second stage for seed):

One fourth (2.5 parts by weight as a solid) of a latex obtained in (1) is taken out, and 186.2 parts by weight of ion-exchanged water and 0.03 parts of sodium dihexylsulfosuccinate are charged into a reactor. The substitution of nitrogen is fully carried out while the mixture is stirred, and then the temperature inside the reactor is elevated to 75° C. This reactor is charged with 0.02 part by weight of ammonium persulfate, and then it is continuously charged with a mixture of 6.0 parts of methyl methacrylate and 1.5 parts by weight of butyl acrylate over 50 minutes. Thereafter, the reaction is continued at 75° C. for 45 minutes to complete same. The reaction ratio is 98%.

(3) Polymerization of an acrylate crosslinked polymer (polymerization at a third stage):

In the presence of a latex obtained in (2), 0.04 part by weight of ammonium persulfate and 0.05 part by weight of sodium dihexylsulfosuccinate are added, and then, a mixture of 63 parts by weight of butyl acrylate and 1.2 parts of triallylisocyanurate which is a crosslinking agent is continuously added at 70° C. over 80 minutes. Thereafter, the reaction is continued at 70° C. for 20 minutes. The polymerization ratio after polymerization at the second stage is 85%.

(4) Polymerization of a rubbery elastomer (polymerization at a fourth stage):

In the presence of 11 parts by weight of the butyl acrylate and 0.18 part by weight of the triallylisocyanurate which remained unreacted in the polymerization (3), 0.045 part by weight of ammonium persulfate and 0.4 part by weight of sodium dihexylsulfosuccinate are added, and then, a mixture of 3.8 parts by weight of acrylonitrile, 11.4 parts of styrene and 0.025 part by weight of t-dodecylmercaptan is continuously added at 75° C. over 90 minutes. The polymerization ratio is 93%.

The amounts of the remaining monomers in the latex are measured by gas chromatography, and the composition ratio of the copolymer as a layer III is calculated to show that the acrylonitrile/styrene/butyl acrylate ratio is 10/43/47.

(5) Polymerization of a final polymer (polymerization at a fifth stage):

In the presence of the latex obtained in (4), a mixture of 2.05 parts by weight of acrylonitrile, 8.86 parts by weight of styrene and 0.02 part by weight of t-dodecylmercaptan is continuously added at 75° C. over 70 minutes. The reaction is further continued at 85° C. for 1 hour to complete the polymerization. The polymerization ratio is 97%.

Further, the amounts of the monomers remaining in the latex are measured by gas chromatography, and the composition ratio of the polymer as a layer IV is calculated to show that the acrylonitrile/styrene/butyl acrylate is 24/65/11.

The latex obtained above is charged into a 3 wt. % sodium sulfate warm solution for salting out and coagulation. Then, the resultant product is repeatedly dehydrated, washed, and then dried to give a multi-layer structure polymer.

(6) Preparation of a resin composition;

The above multi-layer structure polymer (35 parts by weight) and 65 parts by weight of an ST/AN copolymer (ST/AN=70/30 by weight, $\eta_{sp}/C=0.75$ dl/g (0.30/dl chloroform solution, 25° C.)] are mixed in a Henschel mixer for 20 minutes, and the mixture is extruded by using a twin screw extruder with a 30 mm vent (model A, manufactured by Nakatani Kikai K.K.) at 240° C. to form pellets.

The pellets are injection-molded by using an inline screw type injection machine (model IS-75S, manufactured by Toshiba Kikai K.K.) at a molding temperature of 250° C., an injection pressure of 900 kg f/cm$^2$ and a mold temperature of 50° C. to prepare a prescribed test piece, and the physical properties thereof are measured.

The resin composition obtained above gave molded articles which are excellent in both surface gloss and impact resistance.

Figure 1:
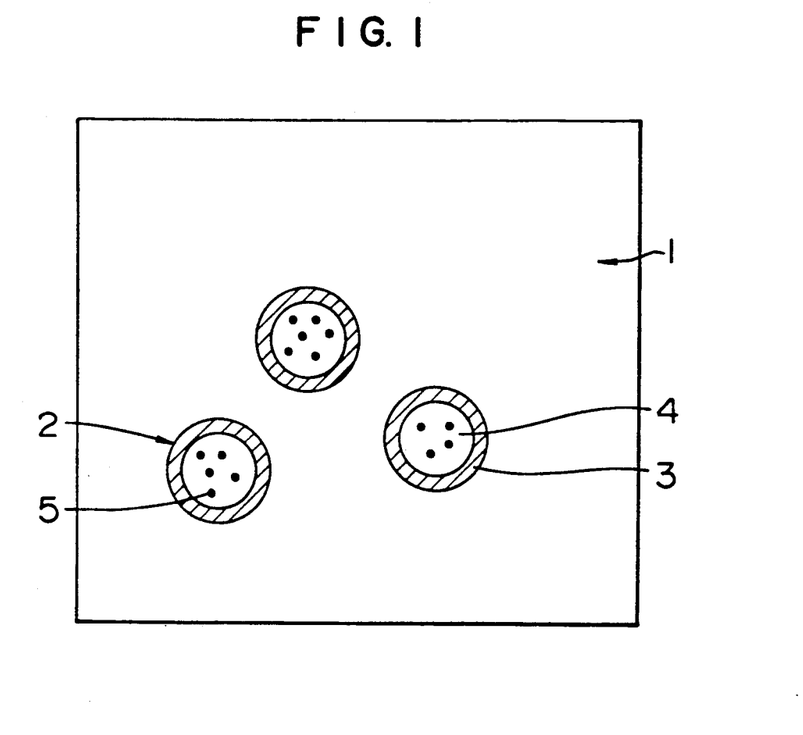
FIG. 1 shows schematic views of a multi-layer structure according to this invention and a transmission-type microscope photograph of a ruthenium-stained, ultra-thinly sliced piece of a thermoplastic resin composition containing the structure.

(7) Analysis, etc., of multi-layer structure polymer:

(i) Staining with ruthenic acid and observation by electron microscope:

The above-explained procedure is repeated to prepare a test piece, from which a ruthenic acid-stained ultra-thin sliced piece is prepared. The observation thereof by using transmission-type electron microscope showed a state in which a sea phase 1 of the thermoplastic resin is dotted with island phases 2 of the multi-layer structure polymer, as is schematically shown in FIG. 1.

A $\beta$ layer 4, which is not stained with the ruthenic acid, had an average particle diameter of 5,000 Å, the island phase 2 as a whole (multi-layer structure polymer) has an average particle diameter of 5,700 Å, and an $\alpha$ phase 3, which is stained with the ruthenic acid, has an average particle diameter of 350 Å. In the portion of the $\beta$ layer 4 not stained with the ruthenic acid, a plurality of ruthenic acid-stained portions ($\gamma$ layer) are nearly totally micro-dispersed.

On the basis of properties of the monomers used to produce the hard polymers, rubbery elastomer and acrylate crosslinked polymer of the multi-layer structure polymer, it is assumed (a) that the $\beta$ layer portion 4 is mainly composed of the butyl methacrylate and methyl methacrylate units for the hard polymers polymerized in the first and second stages and the butyl acrylate and cosslinking or grafting agent units for the acrylate crosslinked polymer polymerized in the third stage, and (b) that the $\alpha$ layer portion 3 is mainly composed of the butyl acrylate, styrene and acrylonitrile units for the rubbery elastomer polymerized in the fourth stage, the styrene and acrylonitrile units for the final polymer polymerized in the fifth stage and the remaining butyl acrylate unit. It is further assumed (c) that the γ layer 5 which is micro-dispersed in the β layer 4 is formed by polymerization of the hard components, mainly styrene, etc., which has been charged for the above α layer portion 3 and flowed into the β layer 4.

The above mechanism is a mere assumption, and the reason for formation of the above structure is not clearly understood.

(ii) Swell degree and tensile modulus:

The multi-layer structure polymer has a swell degree in methyl ethyl ketone of 3.5. The film prepared therefrom has a tensile modulus of 2,500 kg/cm$^2$.

(iii) Composition analysis:

The composition analysis by pyrolysis gas chromatography showed the following; MMA 7.0 wt. %, BA 65.9 wt. %, St 20.0 wt. %, and AN 7.1 wt. %.

COMPARATIVE EXAMPLE 1

(1) Polymerization of a hard polymer in an innermost layer (first stable for seed) and (2) Polymerization of a hard polymer in an innermost layer (second stage for seed):

The procedures of Example 1 are repeated except that 0.19 part by weight of allyl methacrylate is added.

(3) Polymerization of an acrylate crosslinked polymer (polymerization at third stage):

In the presence of a latex obtained in the above (2), 0.13 part by weight of ammonium persulfate and 0.05 part by weight of sodium dihexylsulfosuccinate are added, and hen, a mixture of 63 parts by weight of butyl acrylate and 1.2 parts of triallylisocyanurate which is a crosslinking agent is continuously added at 80° C. over 80 minutes. Thereafter, the reaction is continued at 80° C. for 90 minutes. The polymerization ratio after the above polymerization stages (1) to (3) is 99.5%.

(4) Polymerization of a final polymer (polymerization at fourth stage):

In the presence of a latex obtained in the above (3), 0.045 part by weight of ammonium persulfate and 0.045 part by weight of sodium dihexylsulfosuccinate are added, and then, a mixture of 6.75 parts by weight of acrylonitrile, 20.25 parts by weight of styrene and 0.045 part by weight of t-dodecylmercaptan is continuously added at 75° C. over 160 minutes. The reaction is continued at 85° C. for 1 hour to complete the polymerization. The polymerization ratio is 98%.

The amounts of the monomers remaining in the latex are measured by gas chromatography, and the composition ratio of the copolymer as a layer IV is calculated to show that the acrylonitrile/styrene/butyl acrylate ratio is 25/75/0.

The latex obtained above is treated in the sam manner as in Example 1 for evaluation of the same.

Figure 2:
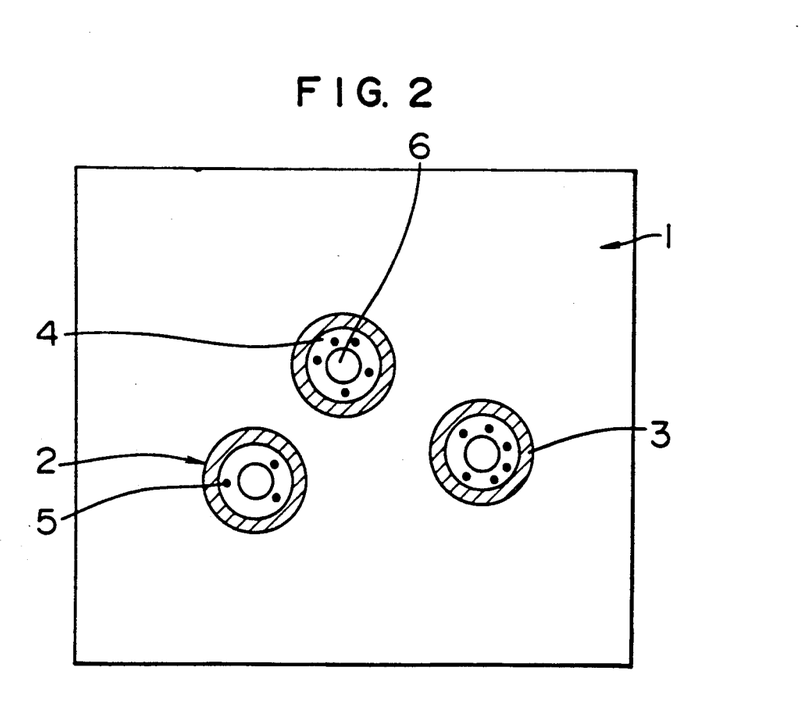
FIG. 2 shows schematic views of a multi-layer structure obtained in Comparative Example and a transmission-type microscope photograph of a ruthenium-stained, ultra-thinly sliced piece of a thermoplastic resin composition containing the structure.

The electron microscopic observation shows the following; a sea phase of the thermoplastic resin is dotted with island phase 2 of the multi-layer structure polymer, the island phase 2 is formed of two layers in a ring form, an inner layer (β layer) portion 4 inside the ring has an average diameter of 4,900 Å, and an outer layer (α layer) portion 3 has an average thickness of 340 Å, as is schematically shown in FIG. 2. It is found that the β layer 4 has an independent, spherical layer 6 having a diameter of 1,200 Å, not stained with osmic acid, which is not present in the case of Example 1. No γ layer 5 which are to be micro-dispersed is found in the spherical layer 6.

EXAMPLES 2-3 AND COMPARATIVE EXAMPLES 2-3

The same seed polymerization as in Example 1 is carried out except that a smaller amount of a latex obtained in the polymerization of the seed at the first stage for the innermost hard polymer is taken out. Further, the seed polymerization is continued by increasing the amount of sodium dihexylsulfosuccinate in the above first stage for the seed.

The resultant latex is treated in the same manner as in Example 1, and evaluated. Table 1 shows the results.

Table 1 shows that when the average diameter of the β layer and the average thickness of the α layer are less than 2,000 Å and 200 Å, respectively, the impact resistance is low although the glossiness is good, and that when they exceed 500 Å and 6,500 Å, respectively, the glossiness is low although the impact resistance is good.

TABLE 1

|  |  |  | Example | | | Comparative Example | | |
|---|---|---|---|---|---|---|---|---|
|  |  |  | 1 | 2 | 3 | 1 | 2 | 3 |
| Dispersion form | (1) | Average particle diameter of β layer Å | 5000 | 2700 | 6500 | 4900 | 1450 | 7600 |
|  | (2) | Average thickness of α layer Å | 350 | 380 | 320 | 340 | 100 | 550 |
|  | (3) | Micro-dispersion of a plurality of small particles of γ layer in α layer | Yes | Yes | yes | No | Yes | Yes |
| Physical property | Izod impact strength (kg · cm/cm) | −23° C. | 21.4 | 16.1 | 23.4 | 8.6 | 8.2 | 24.7 |
|  |  | 30° C. | 7.9 | 5.9 | 7.2 | 5.1 | 4.9 | 14.8 |
|  | Surface gloss | Gate | 95 | 93 | 88 | 90 | 95 | 79 |
|  |  | Edge | 90 | 90 | 85 | 87 | 92 | 77 |
|  | Weatherability SWOM-2000 Hr |  | ⊚ | ⊚ | ⊚ | — | — | — |
| Analysis of acetone-insoluble content | Acetone-insoluble content (wt %) |  | 33 | 33 | 33 | 30 | 33 | 33 |
|  | Swell degree |  | 7.0 | 5.6 | 7.2 | 6.5 | 4.5 | 7.9 |
|  | Tensile modulus (kg/cm$^2$) |  | 2500 | 2600 | 2300 | 2400 | 2800 | 2100 |
| Composition analysis | Multi-layer structure polymer | MMA (wt %) | 7.0 | 7.0 | 7.0 | 7.1 | 7.0 | 7.0 |
|  |  | BA (wt %) | 65.9 | 65.9 | 65.9 | 66.6 | 65.9 | 65.9 |
|  |  | ST (wt %) | 20.0 | 20.0 | 20.0 | 19.4 | 20.0 | 20.0 |

TABLE 1-continued

|  | Example | | | Comparative Example | | |
|---|---|---|---|---|---|---|
|  | 1 | 2 | 3 | 1 | 2 | 3 |
| AN (wt %) | 7.1 | 7.1 | 7.1 | 6.9 | 7.1 | 7.1 |

MMA: methyl methacrylate
BA: butyl acrylate
ST: styrene
AN: acrylonitrile

COMPARATIVE EXAMPLE 4

A weatherability test of an ABS resin (Stylac ABS, manufactured by Asahi Kasei Kogyo K.K.) is carried out by using a dew panel optical control weathermeter, and Table 2 shows the results, in which the resin composition of this invention has excellent weatherability over ABS resin.

TABLE 2

|  | Izod impact strength (23° C. kg cm/cm) | | | |
|---|---|---|---|---|
|  | Initial stage | Irradiation for 10 days | Irradiation for 20 days | Retention ratio % |
| Example 1 | 13.6 | 13.0 | 12.4 | 91 |
| Comparative Example 4 | 30.0 | 15.5 | 9.6 | 32 |

COMPARATIVE EXAMPLE 5

Example 1 is repeated except that the triallylisocyanurate, which is a crosslinking agent, is not used in the polymerization of an acrylate crosslinked polymer.

It is found that a copolymer containing no triallylisocyanurate has an Izod impact strength of 2.1 kg·cm/cm at 23° C., which is poor to a great extent as compared with Example 1.

The microscopic observation shows that there is neither α layer nor β layer.

EXAMPLE 5

Styrene (65 parts by weight), 18 parts by weight of N-phenylmaleimide, 17 parts by weight of acrylonitrile, 0.2 part by weight of t-butyl-2-ethylhexanoate and 0.1 part by weight of octylmercaptan are suspension-polymerized in a water phase consisting of 0.05 part by weight of polyvinyl alcohol and 200 parts by weight of pure water to form a monomer layer. The polymerization is carried out at 80° C. for 5 hours. The polymerization ratio is 98%. The resultant copolymer is referred to as copolymer B-1.

The compositional ratio of the copolymer determined according to nitrogen analysis and H-NMR measurement is that the styrene/acrylonitrile/N-phenylmaleimide ratio is 65/16/19 in percentage by weight.

Further, part of the multi-layer structure polymer obtained in Example 1 and the copolymer B-1 are mechanically mixed such that the butyl acrylate content in the multi-layer structure polymer becomes 22% by weight based on the whole resin (multi-layer structure polymer A/B-1=35/65 in percentage by weight), and melt-kneaded in an extruder at 250° C. to form pellets.

These pellets are injection-molded to prepare various test pieces, and the physical properties thereof are evaluated. The following Table 3 shows the results.

TABLE 3

| Example | Heat deflection temperature (°C.) | Izod impact strength (23° C. kg cm/cm) | | | |
|---|---|---|---|---|---|
|  |  | Initial stage | Irradiation for 10 days | Irradiation for 20 days | Retention ratio % |
| 5 | 106.0 | 13.6 | 13.0 | 12.6 | 93 |

Table 3 shows that the resin composition of this invention has excellent and high impact strength and excellent appearance.

EXAMPLE 6

Part of the multi-layer structure polymer obtained in Example 1 and Delpet 80N (methacrylic resin, manufactured by Asahi Kasei Kogyo K.K.) are mechanically mixed such that the butyl acrylate content becomes 22% b weight based on the whole resin, and then kneaded in a twin screw extruder at 250° C. to form pellets. These pellets are injection-molded to prepare various test pieces, and the physical properties thereof are evaluated.

The following Table 4 shows the physical properties of blends with the methacrylic resin.

TABLE 4

| Example | (Evaluation of resistance to marring and weatherability) | | | | |
|---|---|---|---|---|---|
|  | Rockwell hardness M scale | Izod impact strength (23° C. kg cm/cm) | | | |
|  |  | Initial stage | Irradiation for 10 days | Irradiation for 20 days | Retention ratio % |
| 6 | 69 | 12.6 | 12.4 | 12.2 | 97 |

It is shown that the resin composition of this invention has excellent high impact strength and excellent appearance.

EXAMPLE 7

Part of the multi-layer structure obtained in Example 1, a polycarbonate resin (trade name: Novalex 7025A, manufactured by Mitsubishi Kasei K.K.) and an acrylonitrile-styrene copolymer (tradename: Stylac AS-783, manufactured by Asahi Kasei Kogyo K.K.) are mechanically mixed in a ratio of 20/50/30 in percentage by weight, and kneaded in a twin screw extruder at 280° C. to form pellets.

These pellets are injection-molded to prepare various test pieces, and the physical properties thereof are evaluated. The following Table 5 shows the results.

TABLE 5

| Example | Izod impact strength (kg·cm/cm) 23° C. | Izod impact strength (kg·cm/cm) −30° C. | Tensile strength (kg/cm²) | Elongation (%) | Flexural strength (kg/cm²) | Flexural modulus (kg/cm²) | Glossiness (%) |
| --- | --- | --- | --- | --- | --- | --- | --- |
| 7 | 31.0 | 5.2 | 480 | 50 | 780 | 23900 | 96 |

Part of the multi-layer structure polymer obtained in Example 1 and an acrylonitrile/styrene/butyl acrylate copolymer (weight ratio 37/52/11, solution viscosity 10.1 cps) are mechanically mixed such that the butyl acrylate content in the multi-layer structure polymer becomes 22% by weight based on the whole resin, and then melt-kneaded in an extruder at 250° C. to form pellets. These pellets are injection-molded to prepare various test pieces, and the physical properties thereof are evaluated.

Table 1 shows the composition, gel % and particle diameter of the multi-layer structure polymer. And, Table 6 shows the physical properties of blends with the acrylonitrile/styrene/butyl acrylate copolymer.

TABLE 6

| Example | MFR (g/10 min) | Izod impact strength (23° C. kg cm/cm) Initial stage | Izod impact strength (23° C. kg cm/cm) Irradiation for 10 days | Izod impact strength (23° C. kg cm/cm) Irradiation for 20 days | Retention ratio % |
| --- | --- | --- | --- | --- | --- |
| 8 | 15.6 | 21.9 | 21.2 | 19.9 | 91 |

Thermoplastic resin compositions containing the novel multi-layer structure polymer of this invention have improved weatherability over conventional ABS resin, etc., and there are provided novel excellent weatherability-imparted, impact-resistant resins which give molded articles having not only excellent impact resistance but also excellent appearance.

These resins are usable in a wide field including automobile parts, electronic parts, etc., and in particular, they are usable without any coating for many years for outdoor use where coated articles of metal material, ABS resin, etc., have been conventionally used. Thus, these resins can play a great role in these industrial fields.

What is claimed is:

1. A multi-layer structure polymer (A) comprising (i) 2 to 30% by weight of an alkyl methacrylate unit, (ii) 50 to 80% by weight of an alkyl acrylate unit, (iii) 5 to 20% by weight of an unsaturated nitrile unit and (iv) 5 to 40% by weight of an aromatic vinyl unit, wherein:

(a) the multi-layer structure polymer consists essentially of an inner layer comprising unit (i) and unit (ii) and an outer layer comprising unit (ii), unit (iii) and unit (iv) in a ring form, the portion of the inner layer ($\beta$ layer) within the ring has an average diameter of 2,000 to 6,500 Å, (b) the outer layer ($\alpha$ layer) portion surrounding the inner layer in the ring form has an average thickness of 200 to 500 Å, (c) the inner layer portion has a plurality of small particles comprising unit (iii) and unit (iv) ($\gamma$ layer) totally micro-dispersed, and (d) the multi-layer structure polymer has an acetone-insoluble portion having (i) a swell degree in the methyl ethyl ketone of 1.5 to 10 and (ii) a tensile modulus of 1,000 to 10,000 kg/cm².

2. The multi-layer structure polymer (A) according to claim 1, wherein the alkyl methacrylate unit (i) is a unit selected from the group consisting of methyl methacrylate, ethyl methacrylate and propyl methacrylate.

3. The multi-layer structure polymer (A) according to claim 1, wherein the alkyl acrylate unit l(ii) is a unit selected from the group consisting of methyl acrylate, ethyl acrylate, propyl acrylate and butyl acrylate.

4. The multi-layer structure polymer (A) according to claim 1, wherein the unsaturated nitrile unit (iv) is a unit selected from the group consisting of acrylonitrile and methacrylonitrile.

5. The multi-layer structure polymer (A) according to claim 1, wherein the aromatic vinyl unit is a unit selected from the group consisting of styrene, α-methylstyrene and styrene halide.

* * * * *